W. LOWE.
STEERING ROD APPLIANCE.
APPLICATION FILED APR. 14, 1915.

1,146,631.

Patented July 13, 1915.

Walter Lowe
Inventor,
by
Attorneys.

Witnesses

UNITED STATES PATENT OFFICE.

WALTER LOWE, OF SPARKS, GEORGIA.

STEERING-ROD APPLIANCE.

1,146,631.  Specification of Letters Patent.  Patented July 13, 1915.

Application filed April 14, 1915. Serial No. 21,328.

*To all whom it may concern:*

Be it known that I, WALTER LOWE, a citizen of the United States, residing at Sparks, in the county of Berrien and State of Georgia, have invented a new and useful Steering-Rod Appliance, of which the following is a specification.

The present invention appertains to a steering rod appliance for use on automobiles or motor vehicles, and aims to provide novel and improved means for preventing the vibration or rattling of the steering rod of an automobile which connects the knuckles of the steering wheels, and whereby the steering gear operates smoothly and noiselessly.

It is the object of the invention to provide an appliance which is attachable to the front axle and steering rod in a simple and convenient manner, the appliance being extremely simple, compact and inexpensive in construction, and also being thoroughly efficient and practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1:
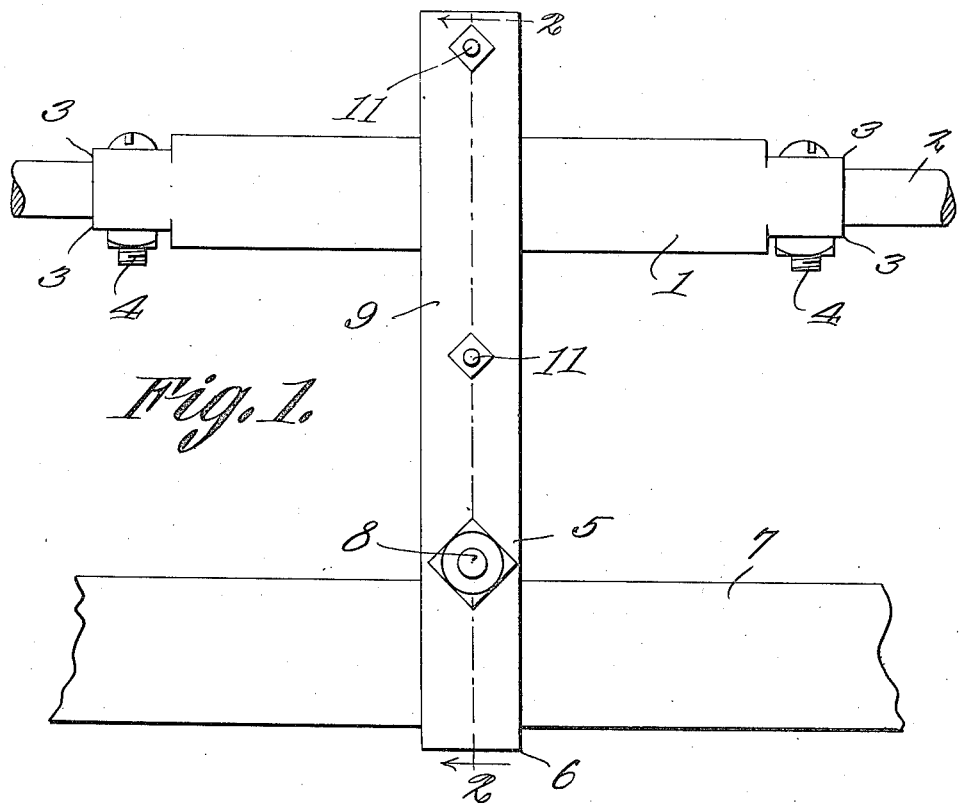
Figure 2:
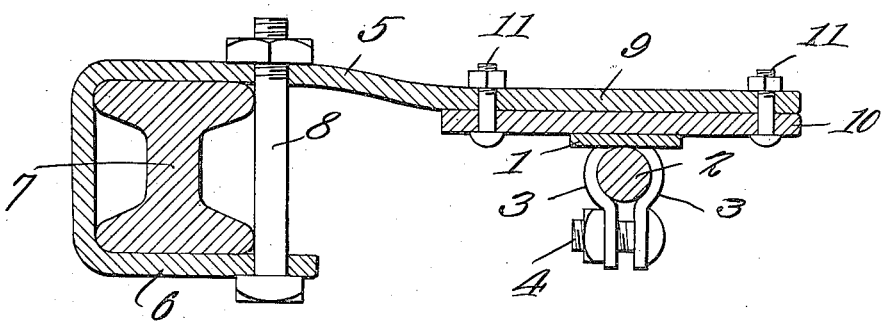

Figure 1 is a plan view of the device as applied to the front axle and steering rod. Fig. 2 is a longitudinal section taken on the line 2—2 of Fig. 1.

In carrying out the invention, there is provided a strip or bar 1 which is adapted to rest snugly upon the steering rod 2 which connects the knuckles (not shown) of the steering wheels in the usual manner, and the ends of the strip 1 are provided with pairs of downwardly bent tongues 3 which provide clips to straddle and embrace the steering rod 2. Bolts 4 are engaged through the ends of the tongues 3 for clamping the clips upon the rod 2, whereby the strip 1 will be properly carried by the steering rod.

The appliance embodies a second part, which is bent from a bar 5, one end portion of the bar being reflexed or bent back, as at 6, to provide a U-shaped clip adapted to straddle the front axle 7 of a motor vehicle. A bolt or clamping element 8 is engaged through the intermediate portion of the bar 5 and the extremity of the portion 6, for clamping the bar 5 or clip thereof upon the axle 7. The other end portion of the bar 5 provides a rearwardly projecting arm 9 which is slightly resilient, although comparatively stiff. The free portion of the arm is preferably offset downwardly sufficiently to bear upon the strip 1 carried by the steering rod.

A leather or equivalent pad 10 is secured to the lower surface of the free portion of the arm 9, by means of a pair of bolts or other securing elements 11, and the pad 10 is arranged so that its intermediate portion bears upon the strip 1.

In applying the device to the steering gear, the bar 5 and strip 1 may be readily and properly attached to the axle and steering rod, respectively, whereby the two parts will coöperate in the necessary manner, with the arm 9 bearing against the strip 1 with sufficient tension to prevent the rattling or vibration of the steering rod 2. When the steering rod 2 is reciprocated during the steering of the machine, the strip 1 will slide across the pad 10, the pad 10 providing a frictional member, which serves to steady the steering gear. If necessary, the arm 9 can yield, and instead of the strip 1 and arm 9 being above the steering rod, the parts may be reversed so that the strip 1 and arm 9 lie below the steering rod.

The attachment may be applied to various automobiles, and may be made in various sizes and proportions for that reason.

The device may be inexpensively manufactured, and has other obvious advantages which need not be itemized at length.

What is claimed is:—

1. In a device of the character described, a bar having one end portion bent back to provide a clip for straddling the front axle of an automobile, the other end portion of the bar forming a resilient arm to bear against the steering rod, and a clamping element engaged through the bar for clamping the clip to the axle.

2. In a device of the character described, a strip adapted to rest against a steering rod and having clamps at its ends to embrace said rod, a bar having one end portion bent back to provide a clip for straddling a front axle, the other end portion of the bar forming a resilient arm to bear against said strip, a clamping element engaged through said bar for clamping the clip upon the axle, and a friction member secured to said arm for the sliding engagement therewith of the strip.

In testimony that I claim the foregoing as my own, I have hereto affixed my signature in the presence of two witnesses.

WALTER LOWE.

Witnesses:
D. G. ECHRO, Jr.,
BENJ. F. GARY.